US007900824B2

(12) United States Patent
Stevens et al.

(10) Patent No.: US 7,900,824 B2
(45) Date of Patent: Mar. 8, 2011

(54) WATCH FOR TRANSACTING FINANCIAL TRANSACTIONS

(75) Inventors: John K. Stevens, Stratham, NH (US); Paul Waterhouse, Selkirk (CA)

(73) Assignee: Visible Assets, Inc., Mississauga, Ontario (CA)

( * ) Notice: Subject to any disclaimer, the term of this patent is extended or adjusted under 35 U.S.C. 154(b) by 819 days.

(21) Appl. No.: 11/829,247

(22) Filed: Jul. 27, 2007

(65) Prior Publication Data

US 2008/0099553 A1 May 1, 2008

Related U.S. Application Data

(60) Provisional application No. 60/821,287, filed on Aug. 3, 2006.

(51) Int. Cl.
*G06K 5/00* (2006.01)

(52) U.S. Cl. ........................................... 235/380; 368/10

(58) Field of Classification Search .................. 235/380; 368/10, 29, 73
See application file for complete search history.

(56) References Cited

U.S. PATENT DOCUMENTS

| | | | | |
|---|---|---|---|---|
| 4,800,543 | A * | 1/1989 | Lyndon-James et al. | 368/10 |
| 6,853,605 | B2 * | 2/2005 | Fujisawa et al. | 368/10 |
| 2002/0065711 | A1 * | 5/2002 | Fujisawa et al. | 705/13 |
| 2002/0107054 | A1 * | 8/2002 | Fujisawa et al. | 455/573 |
| 2006/0269061 | A1 * | 11/2006 | Balasubramanian et al. | 380/247 |
| 2006/0288233 | A1 * | 12/2006 | Kozlay | 713/186 |
| 2007/0109208 | A1 * | 5/2007 | Turner | 343/718 |
| 2007/0132555 | A1 | 6/2007 | August et al. | |
| 2007/0152825 | A1 | 7/2007 | August et al. | |
| 2007/0164903 | A1 * | 7/2007 | Takada | 342/389 |

FOREIGN PATENT DOCUMENTS

| | | |
|---|---|---|
| KR | 10-1998-015664 | 5/1998 |
| KR | 10-2001-0067248 | 10/2001 |
| KR | 20-0319459 | 7/2003 |
| KR | 20-0386433 | 3/2005 |

* cited by examiner

*Primary Examiner* — Ahshik Kim
(74) *Attorney, Agent, or Firm* — Larson & Anderson, LLC

(57) ABSTRACT

An alternative for smart card financial transactions is provided in which the smart card functionality is provided as part of a watch containing a RuBee antenna and transceiver for transmitting the authorization information to a receiver separate from the watch. This form factor allows the user to maintain the card in a readily usable and convenient location. In addition, the watch can be used to allow the user to specifically authorize or override a financial transaction, and to view and/or store information about the financial transaction, as well as conventional functionality such as alarms, and calendars. The watch of the invention can also provide access control or identification in corporate environments if desired.

23 Claims, 4 Drawing Sheets

WATCH FOR TRANSACTING FINANCIAL TRANSACTIONS

STATEMENT OF RELATED CASES

This application claims the benefit of U.S. provisional application 60/821,287 filed Aug. 3, 2006, which application is incorporated herein in its entirety for all purposes.

BACKGROUND OF THE INVENTION

"Smart Cards" are known for use in the financial transactions, and typically have dimensions similar to credit cards. In some cases, the cards require physical contact with the pins of a reader to access information. In other cases, a passive RF link may be added so that the cards may be read via a reader. In most cases, these RF systems are short range, and require substantial proximity between the card and the reader for reading. In this cases, the user removes the card from the card from a purse or wallet and places it near the reader. Cards of this general types may be used for access control, purchase of goods in a store, in ATM machines, and for purchase of fuel.

Often when the transaction takes place, it may be awkward for the user to reach into his or her wallet or purse, and locate and remove the card to complete the transaction. Long wavelength communications protocols which allow transmission of information over greater distances, such as those described in ISO/IEC 18000-6, Type C, "Radio frequency identification for item management—Part 6." (This standard, published by ISO in July 2006, is based on the EPC Gen 2 Class 1 UHF standard developed by EPCglobal.) could make it possible to read and write to a card without removing it from a wallet or purse and placing it in such close proximity to the reader. However, this approach has the disadvantage that the user does not have the ability to stop a transaction or to confirm that the transaction is correct before the communication with the card is completed. Indeed, it is not hard to envisage a person walking through a store unknowingly buying things with a card of this type.

SUMMARY OF THE INVENTION

The present invention provides an alternative for smart card financial transactions in which the smart card functionality is provided as part of a watch. This form factor allows the user to maintain the card in a readily usable and convenient location. In addition, the watch can be used to allow the user to specifically authorize or override a financial transaction, and to view and/or store information about the financial transaction, as well as conventional functionality such as alarms, and calendars. The watch of the invention can also provide access control or identification in corporate environments if desired.

In accordance with one embodiment of the invention, the watch comprising a watch body and a wrist band. The watch body comprises:

(a) a time-keeping component, (b) a memory element for storing authorization information for a financial transaction, (c) a RuBee antenna and transceiver for transmitting the authorization information to a receiver separate from the watch, and (d) a display for displaying output from the time-keeping component.

In specific embodiments, the watch further comprises one or more control buttons, wherein at least one of said buttons functions to control the antenna for transmitting of the authorization information.

The watch of the invention can be used in the conduct of point of sale purchase transactions, and other financial transactions such as ATM withdrawals.

DETAILED DESCRIPTION OF THE INVENTION

Figure 1:
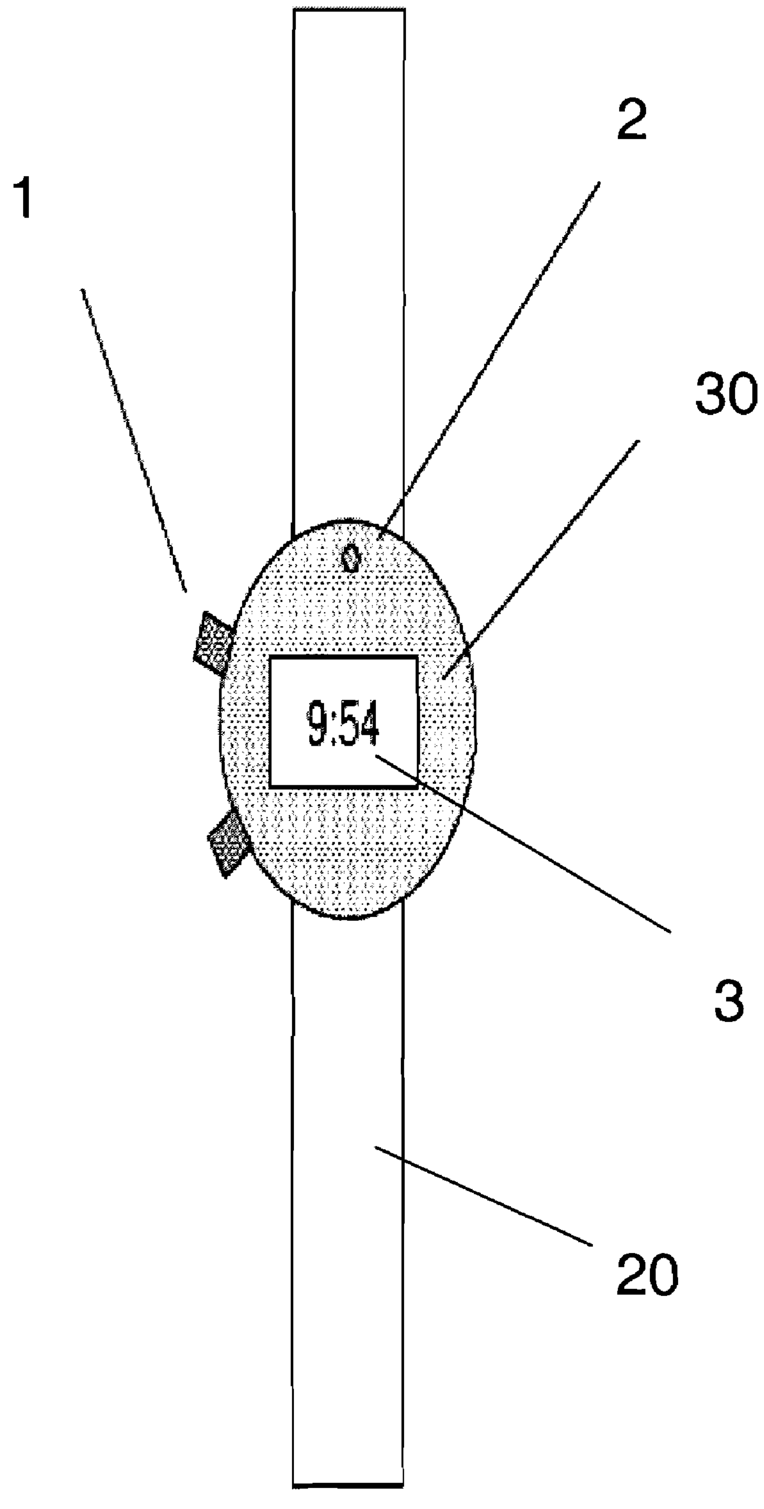
FIG. 1 shows a watch in accordance with the invention.

FIG. 1 shows a watch in accordance with the invention. The watch as a watch body 30 and a wrist band 20, optional buttons 1, an LED 2 and an LCD display 3 which is shown in a time display mode. The watch also incorporates the functionality of a RuBee communications protocol.

RuBee is a bidirectional, on-demand, peer-to-peer communications protocol that uses long wavelength signals to send and receive data packets in a local regional network. "Long wavelength" as used herein refers to a transmitted signals with a frequency of less than 1 megahertz. For example, known RuBee chips operate at frequencies of 131 kilohertz and 450 kilohertz.

The RuBee protocol standard is being defined as IEEE 1902, and has been in commercial use in asset visibility systems and networks for several years. The RuBee protocol is similar to IEEE 802 known as WiFi IEEE 802.11, Zigbee IEEE 802.15.4 and Bluetooth IEEE 802.15.1 in that RuBee radio tags are networked radiating transceivers, but different in that it uses 131 kHz as a frequency. The RuBee protocol uses Internet Protocol (IP) or IP Address and may hold data in its own memory. This protocol functions successfully in harsh environments with networks of many thousands of tags and has a range of 3 to 100 feet depending on the antenna configuration.

A typical RuBee Radio Tag has a 4 bit CPU, 1-5 Kbytes sRam, a crystal, and Li battery with expected life of five years.

Figure 2:
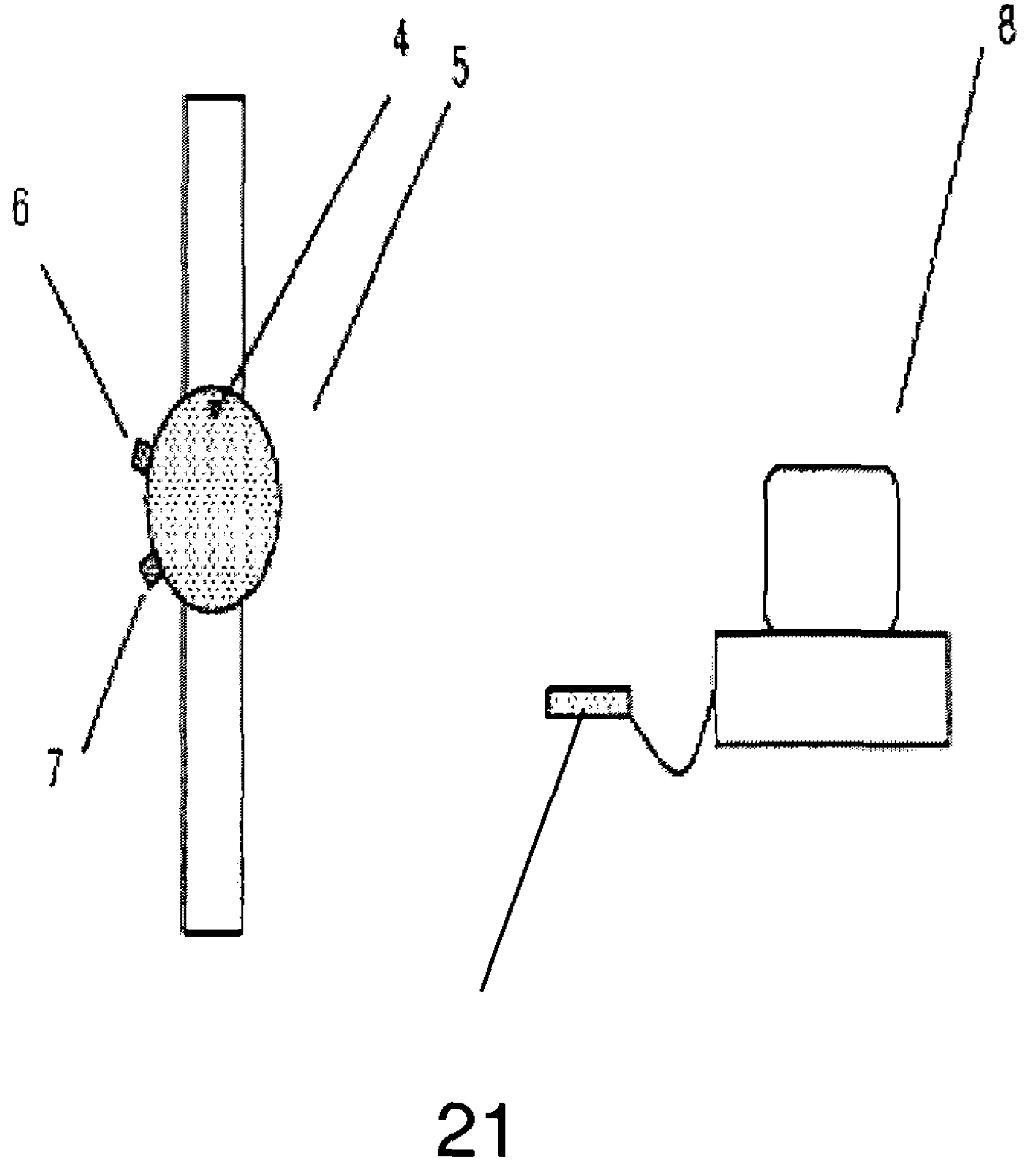
FIG. 2 shows a personal computer with a watch of the invention.

The low frequency tag used in the watch of the invention may be an ultra-low frequency tag described in commonly assigned US Patent Publication No. 2007/0132555 or US Patent Application Publication Number US Patent Application Publication No. US 2007/0152825 A1 which are incorporated herein by reference. The use of the watch has storage capability to maintain access codes, credit card numbers, permissions and the like for use in financial transactions. As depicted in FIG. 2, this information may be stored on the watch through a personal computer interface, where the personal computer 8 is equipped with a RuBee interface 21.

The watch of the invention is used is a method of the invention for conducting a financial transaction. The first step of this method is selecting a financial transaction to be conducted through a transaction control system having a RuBee interface. The nature of the transaction and the nature of the transaction control system are necessarily linked. For example, in the case of banking transaction such as a cash withdrawal the transaction control system may be an ATM machine. In the case of a retail purchase, the transaction control system may be the cash register or a vending machine.

In the method of the invention, authorization information for the financial transaction is transmitted from the watch to the transaction control system. The actual sequence of events involved in this authorization may vary depending on the nature of the financial transaction.

Figure 3:
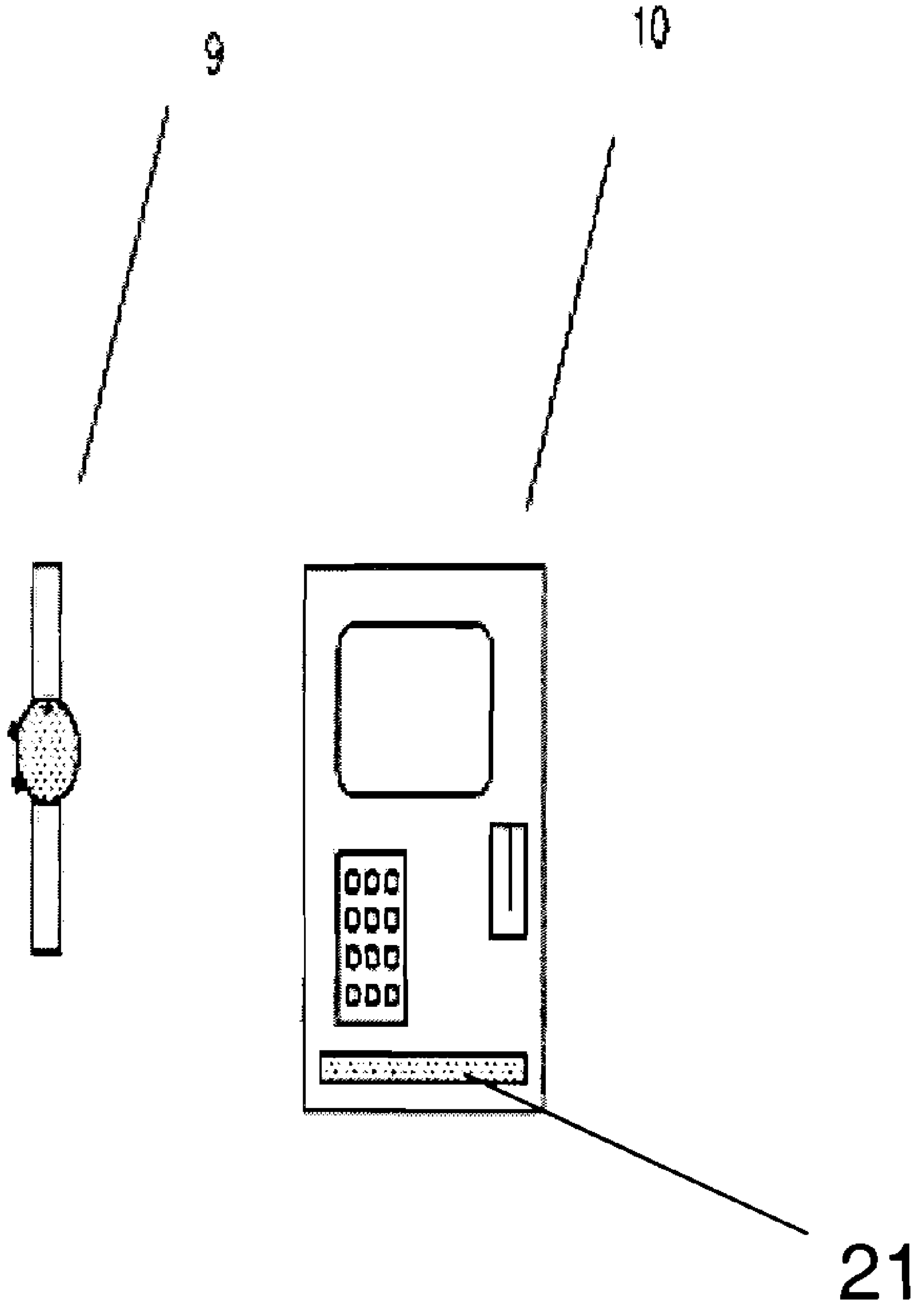
FIG. 3 shows an ATM machine in communication with a watch of the invention.

For example, the transaction control system may be an ATM machine 10 equipped with a RuBee interface 21 as depicted in FIG. 3. When watch 9 comes into proximity with the ATM machine 10, the ATM machine may detect its presence automatically, or a button push on the ATM or the watch may be required. Information about the transaction, such as the amount of cash to be withdrawn, is entered by the user using the conventional key pad of the ATM machine, or may be stored on the watch using the PC interface (for example in the case of a routine withdrawal amount). Authorization or cancellation information is then transferred from the watch in lieu of or in addition to entering of a pin number at the ATM machine.

In some embodiment, the transaction amount such as the amount of the cash withdrawal is transmitted from the transaction control system to the watch prior to transmittal of the authorization information from the watch. In this case, the control button can be used to activate the antenna for transmitting of the authorization information after approval by the user of the transaction amount. In other embodiments, the transaction amount such as the amount of the cash withdrawal is transmitted from the transaction control system to the watch after transmittal of the authorization information from the watch so it is available for later review by the user or download to the user's personal computer. In either case, the watch may store the transaction amount in a user-viewable storage register.

Figure 4:
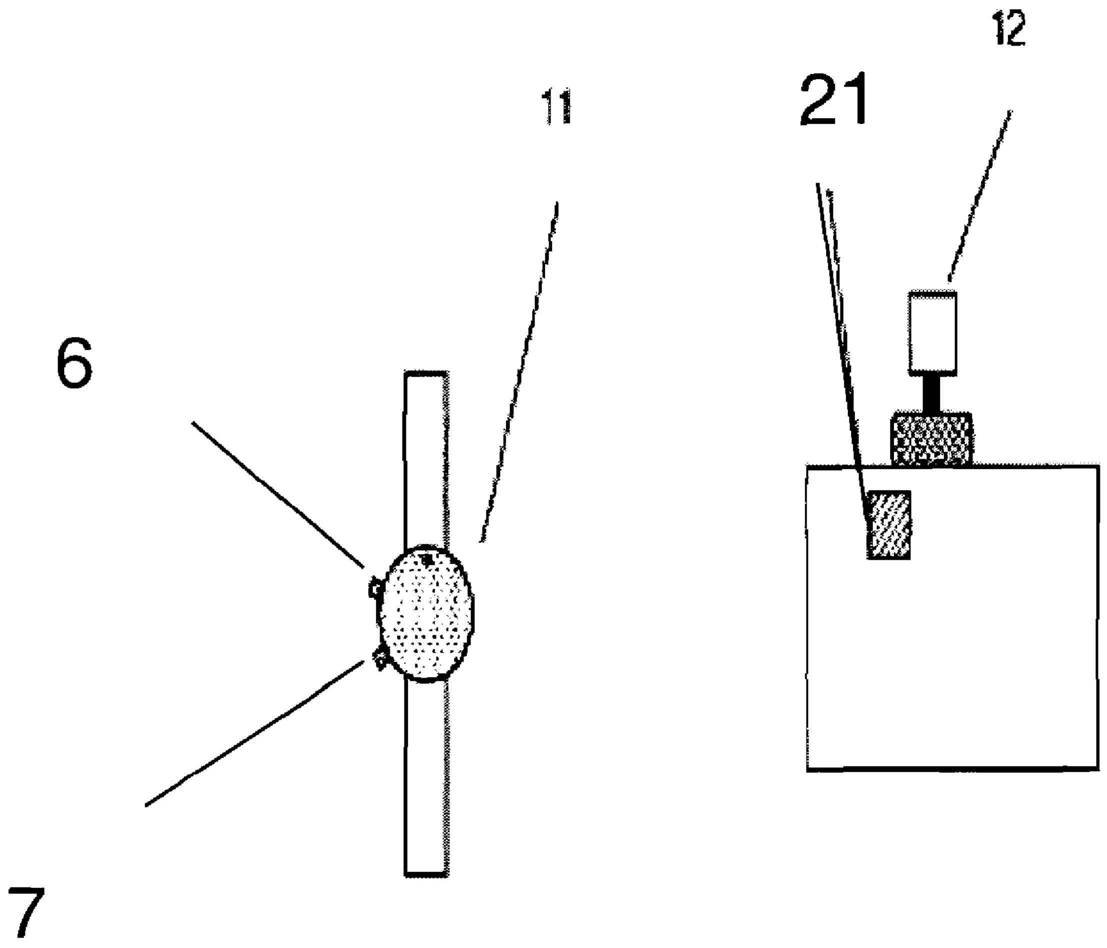
FIG. 4 shows a cash register in communication with a watch of the invention.

In the case of a point-of-purchase payment for goods or services, a first step in the process is selecting a product or service to be purchased and identifying the product or service to a purchase control system such as a cash register 12 in FIG. 4 which is equipped with a RuBee interface 21. The selection of the product or service is made by the user, and the identification may be made, for example, through scanning of a bar code, or through an identifying tag associated with the product or service or by manual entry into the cash register.

In one embodiment, the RuBee interface 21 will transmit a price, to watch 11 where it is displayed to the user. The user may then depress a button 6 to approve the transaction and transmit the information and authorization for the financial transaction (i.e. charging the user's credit card account) or button 7 to disapprove and cancel the transaction. If desired, the value of the approved transaction and if desired information identifying the merchant may be stored in the watch for later display/downloading by the user.

The combination of a watch and a RuBee communication interface provides several advantages. First, in a RuBee device, the antenna geometry is flexible, since tuning is based only on a capacitor and the antenna can be would around the inner diameter of the watch. Further, watches conventionally contain a battery and a timing crystal. Because of the use of the low frequency signal, RuBee communications uses little battery power (allowing battery life of years). The same battery can therefore be used for both the watch functions and the communications functions. Further, because the RuBee communications logic can be incorporated onto the same chip which controls conventional watch functions at no serious incremental cost increase. Finally, conventional watches already have buttons which perform different functions when operating in different modes so no additional structural modifications are required to provide positive control over the authorization of financial transactions.

The invention claimed is:

1. A watch comprising a watch body and a wrist band, wherein the watch body comprises:

(a) a time-keeping component, (b) a memory element for storing authorization information for a financial transaction, (c) a RuBee antenna and transceiver for transmitting the authorization information to a receiver separate from the watch, and (d) a display for displaying output from the time-keeping component.

2. The watch of claim 1, further comprising one or more control buttons, wherein at least one of said buttons functions to control the antenna for transmitting of the authorization information.

3. The watch of claim 2, wherein said at least one control button functions to activate the antenna for transmitting of the authorization information.

4. The watch of claim 1, wherein the antenna also receives information concerning a financial transaction before or after transmitting the authorization information, further comprising a processor for displaying the received information on the display.

5. The watch of claim 4, further comprising one or more control buttons, wherein at least one of said buttons functions to control activation of the antenna for transmitting of the authorization information.

6. The watch of claim 5, wherein said at least one control button functions to activate the antenna for transmitting of the authorization information.

7. The watch of claim 1, wherein the antenna operates at a frequency of less than 1 megahertz.

8. A method of conducting a point of purchase financial transaction comprising the steps of:

(a) selecting a product to be purchased and identifying the product to a purchase control system, and (b) transmitting to the purchase control system authorization information for a financial transaction, wherein the authorization information is transmitted from a watch comprising a watch body and a wrist band, wherein the watch body comprises:

(1) a time-keeping component, (2) a memory element for storing authorization information for a financial transaction, (3) a RuBee antenna and transceiver for transmitting the authorization information to the purchase control system, and (4) a display for displaying output from the time-keeping component.

9. The method of claim 8, further comprising the step of transmitting a transaction amount from the purchase control system to the watch prior to transmittal of the authorization information from the watch.

10. The method of claim 8, wherein the watch further comprising one or more control buttons, wherein at least one of said buttons functions to control the antenna for transmitting of the authorization information, and wherein said at least one control button functions to activate the antenna for transmitting of the authorization information after approval by the user of the transaction amount.

11. The method of claim 10, wherein the watch stores the transaction amount in a user-viewable storage register.

12. The method of claim 8, wherein the watch further comprising one or more control buttons, wherein at least one of said buttons functions to control the antenna for transmitting of the authorization information.

13. The method of claim 12, further comprising the step of transmitting a transaction amount from the purchase control system to the watch after transmittal of the authorization information from the watch.

14. The method of claim 8, wherein the antenna operates at a frequency of less than 1 megahertz.

15. A method of conducting a financial transaction comprising the steps of:

(a) selecting a financial transaction to be conducted through a transaction control system, and (b) transmitting to the transaction control system authorization information for the financial transaction, wherein the authorization information is transmitted from a watch comprising a watch body and a wrist band, wherein the watch body comprises:

(1) a time-keeping component, (2) a memory element for storing authorization information for a financial transaction, (3) a RuBee antenna and transceiver for transmitting the authorization information to the purchase control system, and (4) a display for displaying output from the time-keeping component.

16. The method of claim 15, wherein the financial transaction is an ATM transaction.

17. The method of claim 16, wherein the ATM transaction is a cash withdrawal, and the amount of the cash withdrawal is entered using an interface of the transaction control system by the user without transmission of the amount from the watch.

18. The method of claim 17, further comprising the step of transmitting a transaction amount from the transaction control system to the watch prior to transmittal of the authorization information from the watch.

19. The method of claim 18, wherein the watch further comprising one or more control buttons, wherein at least one of said buttons functions to control the antenna for transmitting of the authorization information, and wherein said at least one control button functions to activate the antenna for transmitting of the authorization information after approval by the user of the transaction amount.

20. The method of claim 19, wherein the watch stores the transaction amount in a user-viewable storage register.

21. The method of claim 16, wherein the watch further comprising one or more control buttons, wherein at least one of said buttons functions to control the antenna for transmitting of the authorization information.

22. The method of claim 21, further comprising the step of transmitting a transaction amount from the purchase control system to the watch after transmittal of the authorization information from the watch.

23. The method of claim 16, wherein the antenna operates at a frequency of less than 1 megahertz.

* * * * *